United States Patent
Vastmans et al.

(10) Patent No.: US 10,694,850 B2
(45) Date of Patent: Jun. 30, 2020

(54) DEVICE AND METHOD FOR MOUNTING A SENSOR AND FOR SEALING A CABINET

(71) Applicants: CommScope Connectivity Belgium BVBA, Kessel-Lo (BE); ADC Czech Republic, s.r.o, Brno (CZ); CommScope Telecommunications (Shanghai) Co., Ltd., Shanghai (CN)

(72) Inventors: Kristof Vastmans, Boutersem (BE); Mojmir Bombera, Jaromerice (BE); Zhaoyang (Carlson) Tong, Shanghai (CN); Lin Lin, Shanghai (CN)

(73) Assignees: CommScope Connectivity Belgium BVBA, Kessel-Lo (BE); ADC Czech Republic, s.r.o, Brno (CZ); CommScope Telcommunication (Shanghai) Co., Ltd, Shanghai (CN)

( * ) Notice: Subject to any disclaimer, the term of this patent is extended or adjusted under 35 U.S.C. 154(b) by 0 days.

(21) Appl. No.: 16/048,853

(22) Filed: Jul. 30, 2018

(65) Prior Publication Data
US 2019/0133321 A1    May 9, 2019

Related U.S. Application Data

(63) Continuation of application No. 15/024,866, filed as application No. PCT/EP2014/070396 on Sep. 24, 2014, now Pat. No. 10,034,546.
(Continued)

(30) Foreign Application Priority Data

Sep. 25, 2013   (CN) .......................... 2013 1 0441909
Sep. 25, 2013   (CN) ..................... 2013 2 0594217 U

(51) Int. Cl.
*A47B 97/00*   (2006.01)
*G01D 11/30*   (2006.01)
(Continued)

(52) U.S. Cl.
CPC ............. *A47B 97/00* (2013.01); *F16M 13/02* (2013.01); *G01D 11/24* (2013.01); *G01D 11/245* (2013.01);
(Continued)

(58) Field of Classification Search
CPC ........ A47B 97/00; F16M 13/02; G01D 11/24; G01D 11/30; G01D 11/245
(Continued)

(56) References Cited

U.S. PATENT DOCUMENTS 4,077,518 A      3/1978  Kisslinger et al.
5,122,782 A *   6/1992  Kawahara ............ B21D 43/025
                                                         29/721
(Continued)

FOREIGN PATENT DOCUMENTS

EP      1 030 330 A1    8/2000
EP      1 741 658 A1    1/2007
(Continued)

OTHER PUBLICATIONS

International Search Report and Written Opinion for International Application No. PCT/EP2014/070396 dated Mar. 11, 2015 (19 pages).

*Primary Examiner* — James O Hansen
(74) *Attorney, Agent, or Firm* — Merchant & Gould P.C.

(57) ABSTRACT

A device for mounting a sensor, comprising: a bracket formed with at least one guide hole therein; at least one support rod each passing through a mounting hole in a housing of the sensor and the guide hole in the bracket and mounted on the housing of the sensor and the bracket; and at least one elastic element each disposed on the support rod, so that the sensor is movable relative to the bracket along the
(Continued)

support rod against the elastic element. Other brackets can be used. The sensor senses when a cabinet door is closed and sealed.

14 Claims, 18 Drawing Sheets

Related U.S. Application Data

(60) Provisional application No. 61/953,509, filed on Mar. 14, 2014.

(51) Int. Cl.
    *G01D 11/24*     (2006.01)
    *F16M 13/02*     (2006.01)
    *F25D 29/00*     (2006.01)

(52) U.S. Cl.
    CPC ...... *G01D 11/30* (2013.01); *A47B 2220/0091* (2013.01); *F25D 29/005* (2013.01); *F25D 2700/02* (2013.01)

(58) Field of Classification Search
    USPC .................. 312/401, 405, 319.1, 319.2, 326
    See application file for complete search history.

(56) References Cited

U.S. PATENT DOCUMENTS

| | | | |
|---|---|---|---|
| 5,684,671 | A | 11/1997 | Hobbs et al. |
| 6,495,777 | B1 * | 12/2002 | Chou ................. H01H 35/2635 |
| | | | 200/83 J |
| 6,927,690 | B2 | 8/2005 | Wilson |
| 7,514,670 | B2 | 4/2009 | Anderson et al. |
| 7,782,196 | B2 | 8/2010 | Piper, Sr. et al. |
| 7,852,213 | B2 | 12/2010 | Browning, Jr. et al. |
| 7,956,316 | B2 | 6/2011 | Browning, Jr. et al. |
| 8,368,534 | B2 | 2/2013 | Crutcher et al. |
| 8,854,608 | B2 | 10/2014 | Onoda et al. |
| 8,965,150 | B2 | 2/2015 | Crutcher et al. |
| 2003/0151339 | A1 | 8/2003 | Reed et al. |
| 2007/0214725 | A1 * | 9/2007 | Miyashita ............... E05F 15/60 |
| | | | 49/340 |
| 2011/0016907 | A1 | 1/2011 | Kang et al. |
| 2011/0255078 | A1 | 10/2011 | Goldner et al. |
| 2012/0074121 | A1 | 3/2012 | Gagas et al. |
| 2012/0167646 | A1 | 7/2012 | Sharma et al. |
| 2013/0070235 | A1 | 3/2013 | Chen et al. |
| 2014/0211202 | A1 | 7/2014 | Niewczas et al. |
| 2014/0233020 | A1 | 8/2014 | Goldner et al. |
| 2016/0116369 | A1 | 4/2016 | Barry et al. |

FOREIGN PATENT DOCUMENTS

| | | |
|---|---|---|
| GB | 2 071 612 A | 9/1981 |
| GB | 2 387 443 A | 10/2003 |

* cited by examiner

DEVICE AND METHOD FOR MOUNTING A SENSOR AND FOR SEALING A CABINET

CROSS-REFERENCE TO RELATED APPLICATIONS

This application is a Continuation of U.S. patent application Ser. No. 15/024,866, filed on Mar. 25, 2016, now U.S. Pat. No. 10,034,546, which is a National Stage of PCT/EP2014/070396, filed on Sep. 24, 2014, which claims the benefit of Chinese Patent Application No. 201310441909.6, filed on Sep. 25, 2013; Chinese Utility Model Application No. 201320594217.0, filed on Sep. 25, 2013; and U.S. Provisional Application No. 61/953,509, filed Mar. 14, 2014, the disclosures of which are incorporated by reference.

FIELD OF THE INVENTION

The present invention relates to a device for mounting a sensor and for sealing a cabinet.

DESCRIPTION OF THE RELATED ART

In the prior art, a contact sensor is often rigidly fixed on a stationary frame, and the contact sensor is not movable relative to the stationary frame. Thereby, the contact sensor must be mounted in a high position accuracy to ensure an external action displacement applied on a sensing contact of the sensor within a maximum stroke (a safe stroke) of the sensing contact. Furthermore, the contact sensor must have an enough mechanical strength to bear an overlarge external action force applied on the sensor by a triggering action (for example, a contact triggering action or a close triggering action).

For some fine sensors, for example, a micro electromechanical sensor or a fiber optic sensor, an overlarge external action force may cause the internal structure of the sensor to collapse and fail. Further, if the sensor is mounted in poor position accuracy, the external action displacement applied on a sensing contact of the sensor may be beyond the maximum stroke of the sensing contact, and the sensor may be ruined.

Providing an indication that the sensor is sensing a correct condition, such as a door being closed, or a door sealing against a seal is also a concern.

SUMMARY

The present invention has been made to overcome or alleviate at least one aspect of the above mentioned disadvantages and concerns.

Accordingly, it is an object of the present invention to provide a device for mounting a sensor, which does not require the sensor to be mounted in high position accuracy.

Accordingly, it is another object of the present invention to provide a device for mounting a sensor, which ensures that the sensor can still work normally under an overlarge external action force or an overlarge external action displacement.

According to an aspect of the present invention, there is provided a device for mounting a sensor, comprising: a bracket formed with at least one guide hole therein; at least one support rod each passing through a mounting hole in a housing of the sensor and the guide hole in the bracket and mounted on the housing of the sensor and the bracket; and at least one elastic element each disposed on the support rod, so that the sensor is movable relative to the bracket along the support rod against the elastic element.

In an exemplary embodiment of the present invention, wherein the elastic element is configured that:
(i) the elastic element exerts an initial deformation force F0 on the sensor when there is no an external action force F1 exerted on the sensor, the initial deformation force F0 is set to be slightly larger than a first external action force F1' under which a sensing contact of the sensor is moved to a position flush with the housing and less than a maximum external action force Fmax allowed to be exerted on the sensor; and
(ii) the initial deformation force F0 is exerted on the sensor in a direction opposite to a direction in which the external action force F1 is exerted on the sensor, wherein when the external action force F1 exerted on the sensor is less than or equal to the initial deformation force F0, the housing of the sensor is not moved, and the elastic element is not moved and deformed by the housing; and wherein when the external action force F1 exerted on the sensor is increased to be larger than the initial deformation force F0, the housing of the sensor begins to be moved against the elastic element, and a portion of the external action force F1 beyond the initial deformation force F0 is converted into a deformation force of the elastic element to ensure that the sensor works normally under an overlarge external action force or an overlarge external action displacement.

In another exemplary embodiment of the present invention, an opening is formed in the bracket; and at least a portion of the housing of the sensor is received in the opening and movable in the opening.

In another exemplary embodiment of the present invention, the device comprises a plurality of support rods, and the plurality of support rods pass through respective mounting holes in the housing and respective guide holes in the bracket.

In another exemplary embodiment of the present invention, the support rod has a first end and a second end opposite to the first end; and the first end of the support rod is positioned at one of the sensor and the bracket, and the second end of the support rod is positioned at the other of the sensor and the bracket.

In another exemplary embodiment of the present invention, a radial slot is formed in the first end of the support rod, and a stop piece is provided in the radial slot to position the first end of the support rod at one of the sensor and the bracket; and a radial protrusion portion is formed on the second end of the support rod to position the second end of the support rod at the other of the sensor and the bracket.

In another exemplary embodiment of the present invention, the opening is opened at a side edge of the bracket and has a substantially U-shape.

In another exemplary embodiment of the present invention, two elastic elements are disposed at both sides of the support rod relative to the bracket, respectively.

In another exemplary embodiment of the present invention, one elastic element is disposed at only one side of the support rod relative to the bracket.

In another exemplary embodiment of the present invention, the bracket comprises: a first portion on which the sensor is mounted; and a second portion perpendicular to the first portion and fixed to a stationary body.

In another exemplary embodiment of the present invention, the bracket is formed by folding a strip of plate material; and the first portion is configured to be a rectangle frame formed by folding the strip of plate material.

In another exemplary embodiment of the present invention, the bracket comprises: a first wall on which the sensor is mounted; a second wall perpendicular to the first wall and fixed to a stationary body; and a third wall connected between the first and second walls, so that the bracket exists a triangle shape.

In another exemplary embodiment of the present invention, the bracket is made by molding or machining.

In another exemplary embodiment of the present invention, the sensor is configured to be a contact sensor.

In another exemplary embodiment of the present invention, the sensor is configured to be a micro electromechanical sensor or a fiber optic sensor.

In the various embodiments of the present invention, when an overlarge external action force beyond the initial deformation force (that is, a protection force for the sensor) F0 or an overlarge external action displacement beyond the maximum stroke of the sensing contact is applied on the sensor, the sensor is moved relative to the bracket along the support rod against the elastic element. Since the elastic element can provide an elastic buffer distance for the sensor, it reduces the request for the initial mounting position accuracy of the sensor, and ensures that the sensor can still work normally under the overlarge external action force or the overlarge external action displacement.

In another exemplary embodiment of the present invention, the sensor is configured to be a contact sensor to sense when a door of a cabinet is properly closed and a seal is properly engaged.

DESCRIPTION OF THE DRAWINGS

The above and other features of the present invention will become more apparent by describing in detail exemplary embodiments thereof with reference to the accompanying drawings, in which.

DETAILED DESCRIPTION

Figure 1:
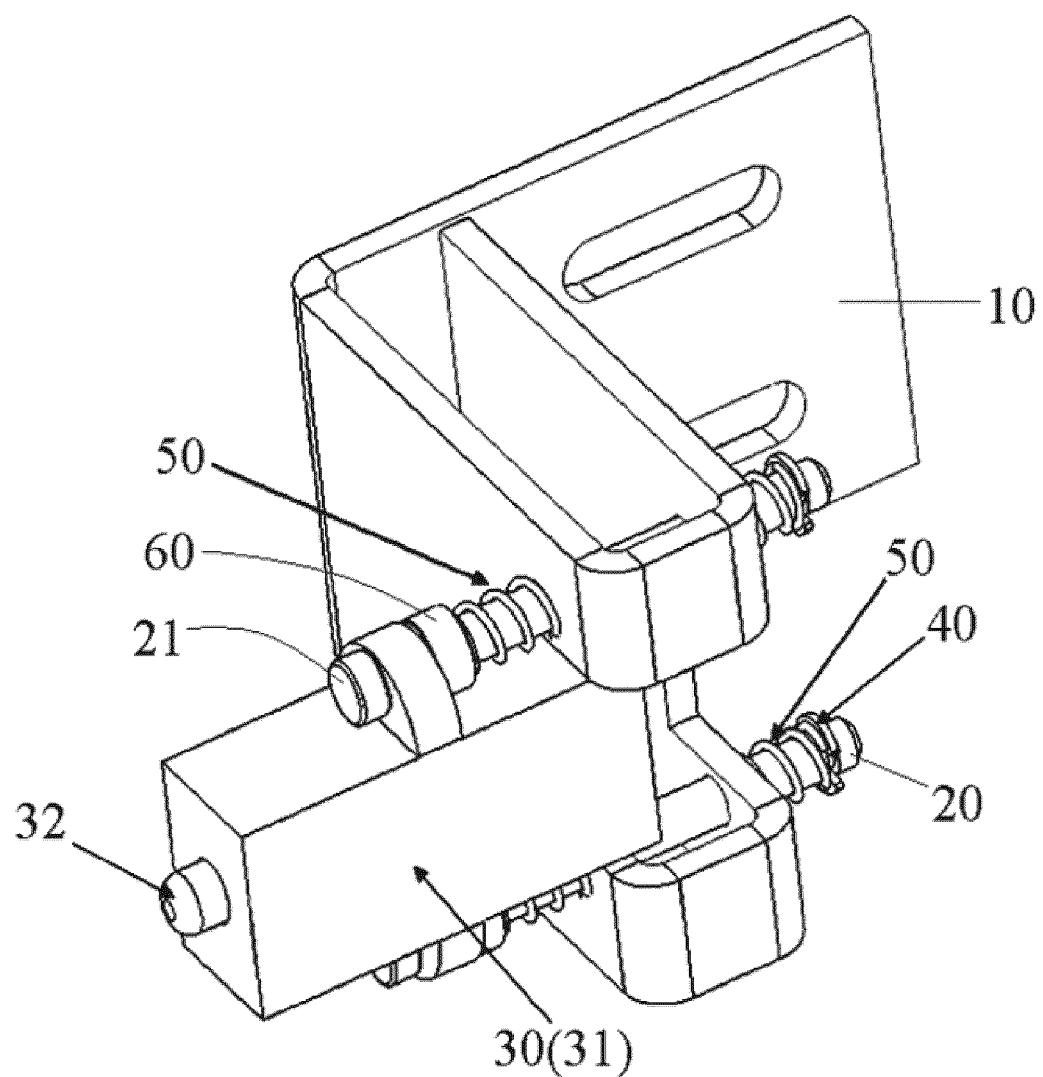
FIG. 1 is an illustrative perspective view of a device for mounting a sensor according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 2:
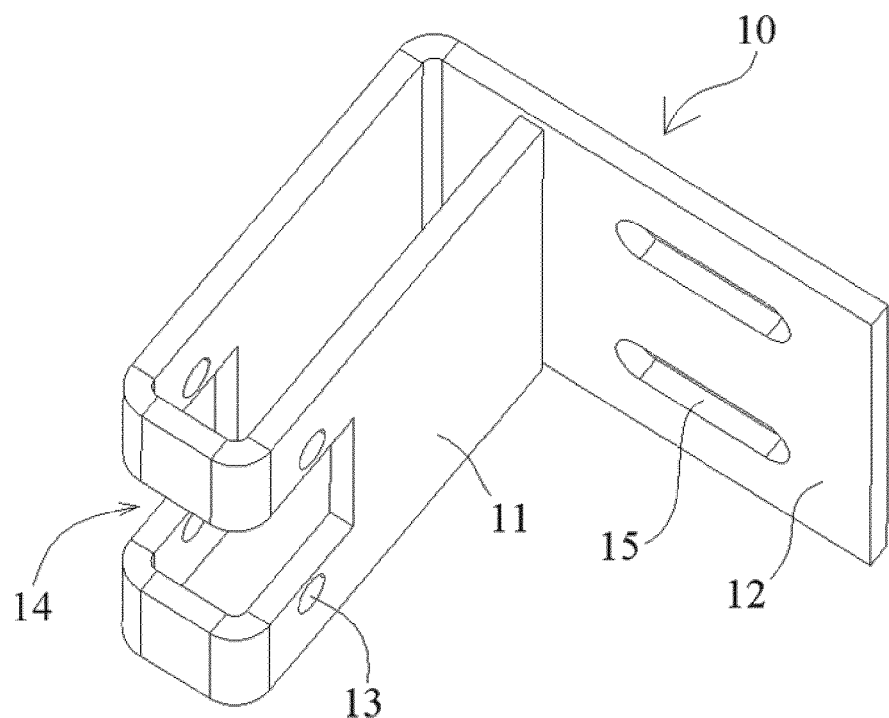
FIG. 2 is an illustrative perspective view of a bracket of the device of FIG. 1.
Figure 3:
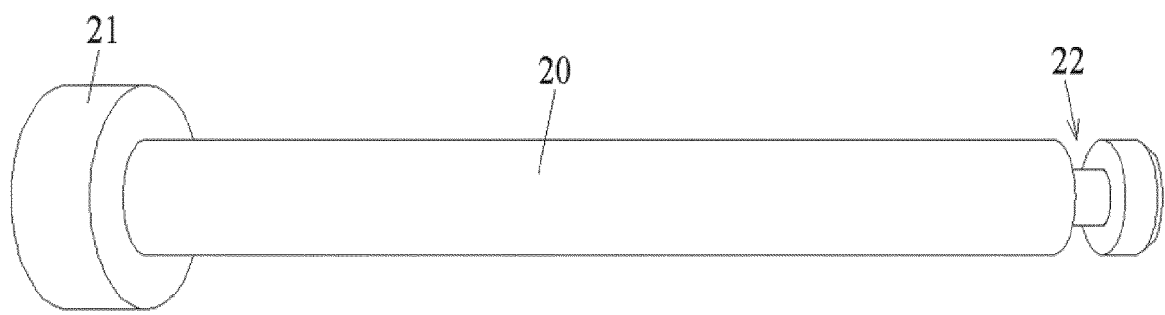
FIG. 3 is an illustrative perspective view of a support rod of the device of FIG. 1.

FIG. 1 is an illustrative perspective view of a device for mounting a sensor 30 according to an exemplary embodiment of the present invention; FIG. 2 is an illustrative perspective view of a bracket 10 of the device of FIG. 1; FIG. 3 is an illustrative perspective view of a support rod 20 of the device of FIG. 1.

As shown in FIGS. 1-3, in an exemplary embodiment of the present invention, there is provided a device for mounting a sensor 30, comprising: a bracket 10 formed with at least one guide hole 13 therein; at least one support rod 20 each passing through a mounting hole in a housing 31 of the sensor 30 and the guide hole 13 in the bracket 10 and mounted on the housing 31 of the sensor 30 and the bracket 10; and at least one elastic element 50 each disposed on the support rod 20, so that the sensor 30 is movable relative to the bracket 10 along the support rod 20 against the elastic element 50.

As shown in FIGS. 1-3, the bracket 10 mainly comprises a first portion 11 and a second portion 12. The sensor 30 is mounted on the first portion 11. The second portion 12 is perpendicular to the first portion 11 and fixed to a stationary body (not shown).

As shown in FIG. 2, a plurality of elongated through holes 15 are formed in the second portion 12. Fasteners, for example, screws or bolts, may be inserted through the holes 15 and secured to the stationary body.

Referring to FIGS. 1-3, in the illustrated embodiment, the bracket 10 is formed by folding, cutting, and punching a strip of plate, and the first portion 11 is configured to be a rectangle frame formed by folding the strip of plate.

As shown in FIGS. 1-2, an opening 14 is formed in the bracket 10. The opening 14 is opened at a side edge of the bracket 10 and has a substantially U-shape. In this way, the sensor 30 can be easily mounted in the opening 14. As shown in FIG. 1, at least a portion of the housing 31 of the sensor 30 is received in the opening 14 and movable in the opening 14.

Please refer to FIGS. 1-3 again, the device comprises a pair of support rods 20. One of the support rods 20 passes through an upper mounting hole in the housing 31 and an upper guide hole 13 in the bracket 10 above the opening 14, and the other of the support rods 20 passes through a lower mounting hole in the housing 31 and a lower guide hole 13 in the bracket 10 below the opening 14. Please note that the present invention is not limited to the illustrated embodiment, the device may comprise one, three or more support rod(s) 20.

As shown in FIGS. 1-3, the support rod 20 has a first end (right end in FIG. 3) and a second end (left end in FIG. 3) opposite to the first end. The first end of the support rod 20 passes through the mounting hole in a housing 31 of the sensor 30 and the guide hole 13 in the bracket 10.

Referring to FIGS. 1-3, in an exemplary embodiment, a radial ring slot 22 is formed in the first end of the support rod 20, and a stop piece 40 is provided in the radial ring slot 22 to position the first end of the support rod 20 at the bracket 10. A radial protrusion portion 21 is formed on the second end of the support rod 20 to position the second end of the support rod 20 on the housing 31 of the sensor 30.

With this configuration, the support rod 20 can be mounted on the housing 31 of the sensor 30 and the bracket 10 by the stop piece 40 at the first end and the radial protrusion portion 21 at the second end, respectively. Further, the support rod 20 cannot be disengaged from the housing 31 of the sensor 30 and the bracket 10 under the limit of the stop piece 40 and the radial protrusion portion 21.

But the present invention is not limited to the illustrated embodiment, the first end of the support rod 20 having the radial slot 22 may be positioned on the housing 31 of the sensor 30, and the second end of the support rod 20 having the radial protrusion portion 21 may be positioned at the bracket 10.

Alternatively, the first end and the second end of the support rod 20 each may be formed with the radial slot 22, and the first end and the second end of the support rod 20 may be positioned at the bracket 10 and the sensor 30, respectively, by inserting the stop pieces 40 into the radial slots 22.

As shown in FIGS. 1-3, two elastic elements 50 are disposed at both sides of the support rod 20 relative to the bracket 10. The elastic element 50 may be a spring or other suitable elastic piece. At one side of the support rod 20 distal to the sensor 30, a first elastic element 50 is mounted on the support rod 20 with one end elastically engaged to (or contact) the stop piece 40 and the other end elastically engaged to (or contact) the bracket 10. At the other side of the support rod 20 proximal to the sensor 30, a second elastic element 50 is mounted on the support rod 20 with one end being elastically engaged to (or contact) a washer 60 (sleeved on the support rod 20 and abutted against the housing 31 of the sensor 30, for example, an elastic washer) and the other end elastically engaged to (or contact) the bracket 10.

It should be noted that the washer 60 is not necessary in the present invention, the washer 60 may be eliminated, and the second elastic element 50 may be directly and elastically engaged to (or contact) the housing 31 of the sensor 30.

In the illustrated embodiment, the sensor 30 is configured to be a contact sensor. For example, the sensor 30 may be configured to be a micro electromechanical sensor or a fiber optic sensor.

As shown in FIG. 1, in an exemplary embodiment of the present invention, the elastic element 50 is configured that:

(i) the elastic element 50 exerts an initial deformation force F0 on the sensor 30 when there is no an external action force F1 exerted on the sensor 30, the initial deformation force F0 is set to be slightly larger than a first external action force F1' under which a sensing contact 32 of the sensor 30 is moved to a position flush with the housing 31 and less than a maximum external action force Fmax allowed to be exerted on the sensor 30; and (ii) the initial deformation force F0 is exerted on the sensor 30 in a direction opposite to a direction in which the external action force F1 is exerted on the sensor 30.

With this configuration, when the external action force F1 exerted on the sensor 30 is less than or equal to the initial deformation force F0, the housing 31 of the sensor 30 is not moved, and the elastic element 50 is not moved and deformed by the housing 31. When the external action force F1 exerted on the sensor 30 is increased to be larger than the initial deformation force F0, the housing 31 of the sensor 30 begins to be moved against the elastic element 50, and a portion of the external action force F1 beyond the initial deformation force F0 is converted into a deformation force of the elastic element 50 to ensure that the sensor 30 works normally under an overlarge external action force or an overlarge external action displacement.

Furthermore, with the above configuration, when the external action force F1 exerted on the sensor 30 is increased to be larger than a force Fa under which the sensing contact 32 is triggered and less than the first external action force F1', the sensor 30 is triggered and sends a signal.

Furthermore, with the above configuration, when the external action force F1 exerted on the sensor 30 is increased to be equal to the first external action force F1', the sensing contact 32 is moved to the position flush with the housing 31.

Furthermore, with the above configuration, when the external action force F1 exerted on the sensor 30 is increased to be larger than the first external action force F1' and less than the initial deformation force F0, a portion of the external action force F1 beyond the first external action force F1' is directly exerted on the housing 31 of the sensor 30. As a result, the effective action force on the sensing contact 32 is kept to be less than the maximum external action force Fmax.

The above mentioned forces Fa, F1', F0, Fmax satisfy the following expression (1):

$$Fa<F1'<F0<Fmax \qquad (1)$$

The forces Fa, F1', F0, Fmax each is a constant, and the external action force F1 is a variable and can be gradually increased from zero. When the external action force F1 is increased to the force Fa, the sensor is trigged and sends the signal. When the external action force F1 is increased to the force F1', the sensing contact 32 is moved to the position flush with the housing 31, at this time, the sensing contact 32 reaches the maximum stroke thereof. When the external action force F1 is increased to be larger than the F1' and less than the force F0, the sensing contact 32 and the housing 31 are not moved and are kept in a stationary state. When the external action force F1 exerted on the sensor 30 is increased to be larger than the initial deformation force F0, the housing 31 of the sensor 30 begins to be moved against the elastic element 50.

In the present invention, the elastic element 50 is compressed or stretched during mounting the sensor 30 to generate the initial deformation force F0. The initial deformation force F0 is served as the protection force for the sensor 30 and may be adjusted as necessary. For example, the initial deformation force F0 of the elastic element 50 may be adjusted by changing the initial compressed or stretched amount, the material, or the size of the elastic element 50.

Although it is not shown, an adjusting means for adjusting the initial compressed or stretched amount of the elastic element 50 may be provided on the support rod 20. For example, the adjusting means may comprise a nut screwed on the support rod 20. In this case, the initial compressed or stretched amount of the elastic element 50 can be changed by screwing the nut on the support rod 20.

In an alternatively embodiment, the adjusting means may comprise a plurality of radial slots 22 formed at different axial positions of the support rod 20. In this case, the initial compressed or stretched amount of the elastic element 50 may be changed by inserting the stop piece into different radial slots 22.

In an exemplary embodiment, the initial deformation force F0 of the elastic element 50 may be changed by adjusting the length of the elastic element 50, the elasticity coefficient of the elastic element 50, the thickness of the stop piece 40 or the washer 60.

As shown in FIG. 1, the sensing contact 32 extends out of the housing 31 of the sensor 30 and can be moved by a safe stroke (the maximum stroke) relative to the housing 31. When the external action displacement is larger than the safe stroke, the external action force is directly exerted on the housing 31 of the sensor 30. Since the housing 31 is moveably mounted on the support rod 20, the housing 31 can be moved by a distance (this distance can be adjusted by changing the number of the coils of the elastic element 50 and the position of the radial slot 22 on the support rod 20) relative to the bracket 10 along the support rod 20 against the deformation force of the elastic element 50 when the over-large external action force is exerted on the housing 31.

Generally, the external action displacement is within the safe stroke of the sensing contact 32 if the sensor 30 is accurately mounted in position. However, if the sensor 30 is mounted in poor position accuracy, the external action displacement may exceed the safe stroke of the sensing contact 32. In the prior art, since the sensor is rigidly fixed to a stationary frame and cannot be moved, the sensor may be ruined when the external action displacement exceeds the safe stroke of the sensing contact. Therefore, in the prior art, the sensor must be mounted in high position accuracy to prevent the external action displacement from exceeding the safe stroke of the sensing contact.

In the present invention, the support rod(s) and the elastic element(s) function as a bumper which can absorb the external action displacement exceeding the safe stroke of the sensing contact. Even if the sensor 30 is mounted in poor position accuracy and the external action displacement exceeds the safe stroke of the sensing contact 32, the sensor 30 can still work normally. Accordingly, the present invention reduces the request for the initial mounting position accuracy of the sensor 30.

Figure 4:
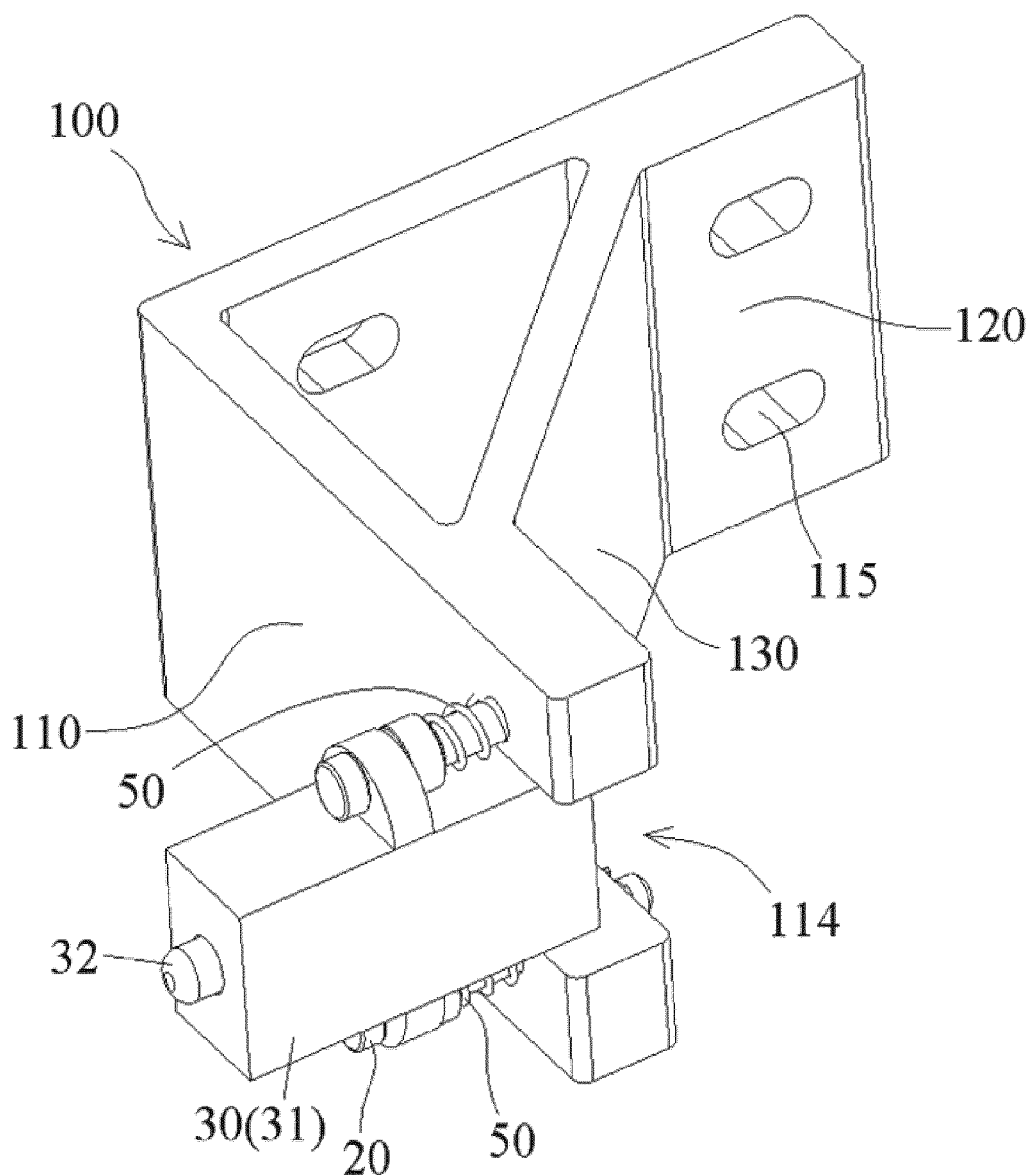
FIG. 4 is an illustrative perspective view of a device for mounting a sensor according to another exemplary embodiment of the present invention.

FIG. 4 is an illustrative perspective view of a device for mounting a sensor 30 according to another exemplary embodiment of the present invention.

As shown in FIG. 4, an elastic element 50 is disposed at only one side of the support rod 20 proximal to the sensor 30, and there is not disposed the elastic element 50 at the other side of the support rod 20 distal to the sensor 30. But the present invention is not limited to the illustrated embodiment, in an alternative embodiment, the elastic element 50 may be disposed at only one side of the support rod 20 distal to the sensor 30, and there is not disposed the elastic element 50 at the other side of the support rod 20 proximal to the sensor 30.

In the embodiment shown in FIG. 4, the bracket 100 mainly comprises: a first wall 110 on which the sensor 30 is mounted; a second wall 120 perpendicular to the first wall 110 and fixed to a stationary body; and a third wall 130 connected between the first and second walls 110, 120, so that the bracket 100 exists a triangle shape.

As shown in FIG. 4, an opening 114 is formed in the first wall 110. At least a portion of the housing 31 of the sensor 30 is received in the opening 114 and movable in the opening 114. A plurality of elongated through holes 115 are formed in the second wall 120. Fasteners, for example, screws or bolts, may be inserted through the holes 115 and secured to a stationary body (not shown).

In an exemplary embodiment of the present invention, the bracket 100 may be made by molding or machining.

The use of the sensor and the calculation of spring position with reference to a seal of an enclosure or cabinet is shown in FIGS. 5-19.

The sensor 200 is mounted with a spring 1, that has to move over a distance Δx1 to be activated to send a signal.

The sensor is mounted on two additional springs 2 that are fixed in the cabinet. When the sensor is activated, the door edge 300 needs to just touch the seal 400. The springs 2 will then have moved over a distance Δx2. Once the door touches the seal, the seal may be further compressed against cabinet body 450 during closing. When the seal is fully compressed by the door the sensor has to be activated.

There are defined spring constants k1 for the spring 1 and k2 for each of the springs 2.

As the springs are mounted in series, the total force is the same, assuming no preloading of the springs.

Taking as reference 0, when the spring is in the rest position:

$F1=k1*x1$ $F2=k2*x2$

As there are two springs 2:

$F1=2*F2$ $k1*x1=2*k2*x2$ $x2=(k1*x1)/(2*k2)$

When the sensor is activated:

$x1=\Delta x1$

At that moment springs 2 have moved: at least Δx2+ ΔxTolerance. Therefore:

$\Delta x2=(k1*\Delta x1)/(2*k2)$

Figure 5:
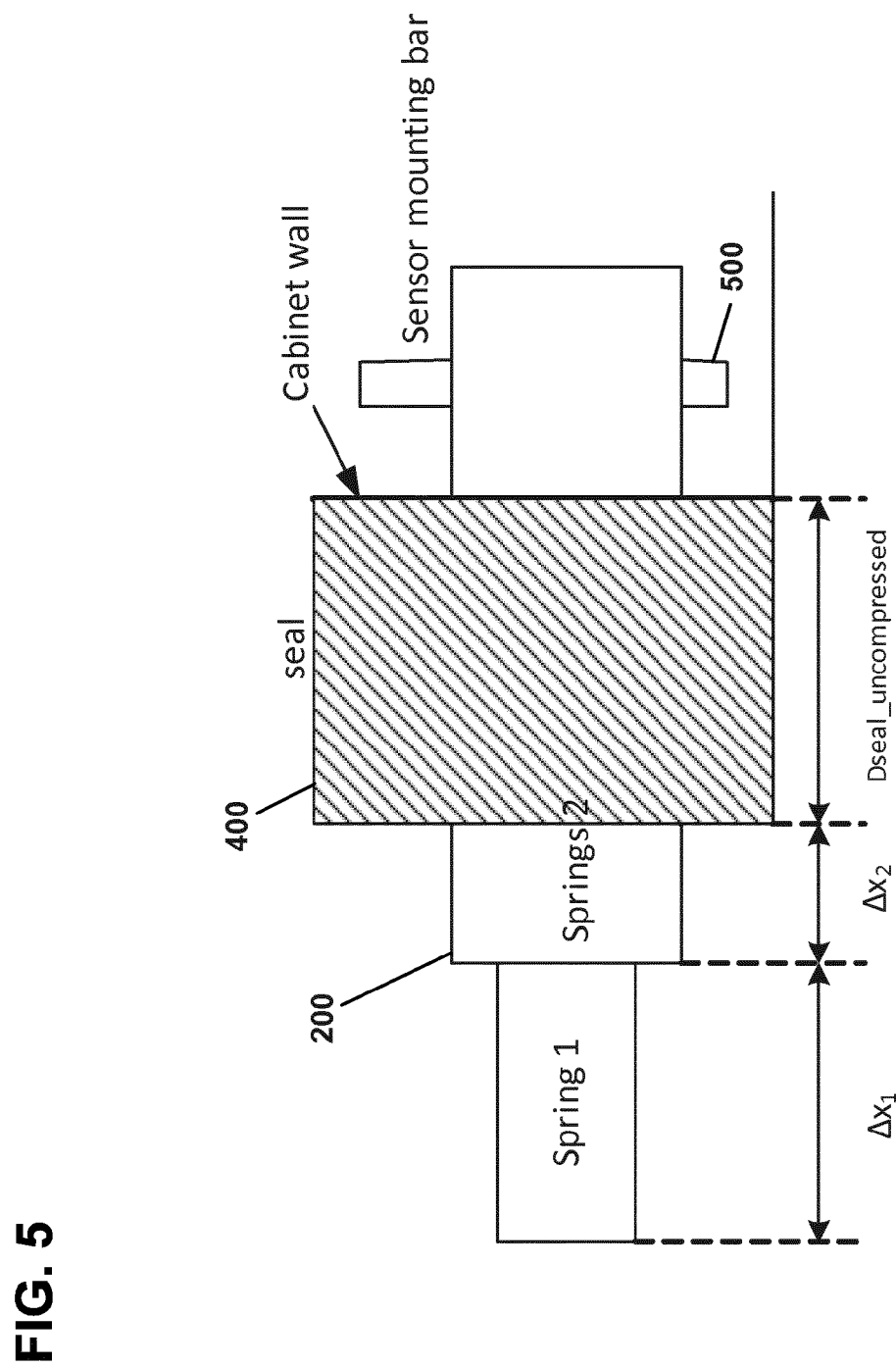
FIGS. 5-19 are illustrative of a sensor mounting device and method for use in detecting a closed door against a seal of a cabinet.

During the mounting of the door sensor in the cabinet the sensor will be positioned to guarantee that:

1. When the sensor is activated, the door is touching the seal. To guarantee this, the maximum outward position of the top of the sensor (out of the cabinet wall) may be:

Δx1+Δx2+Dseal_uncompressed (see FIG. 5—Maximum outward position of the sensor).

In this mounting position, spring 1 will be fully compressed just when the door touches the seal. When the door is closed further and the seal is compressed, only the springs 2 will be further compressed.

Figure 6:
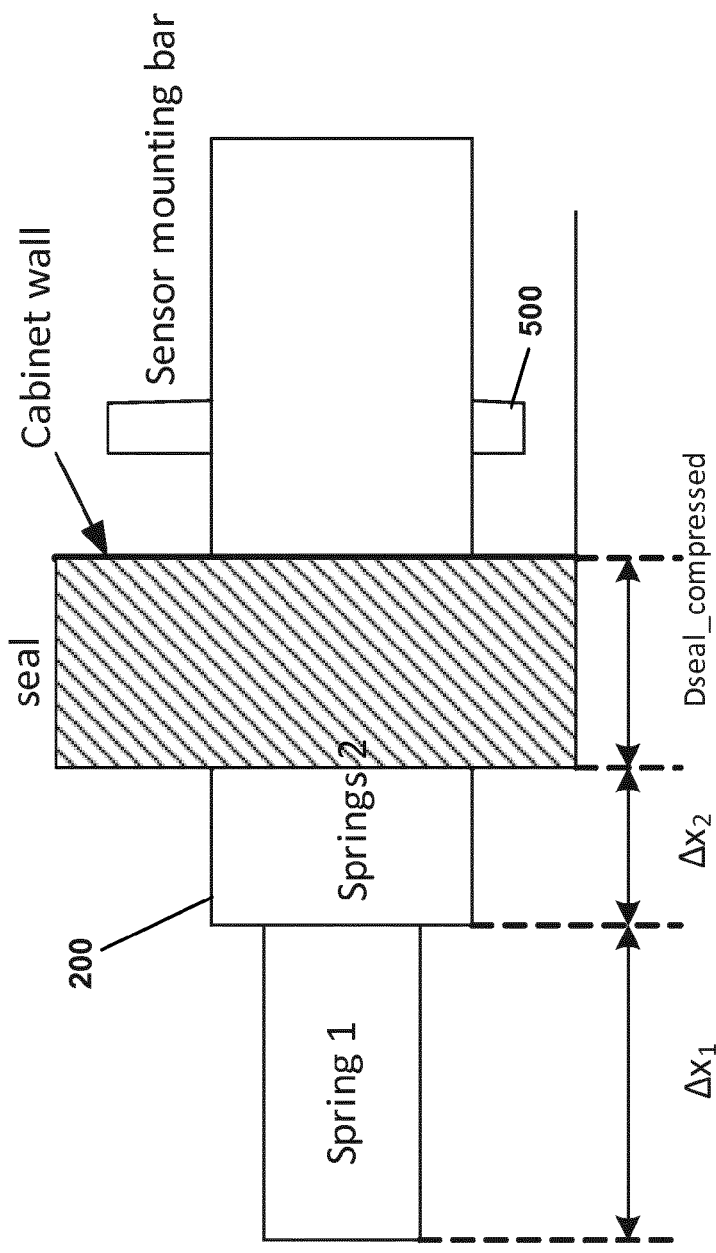
Figure 7:
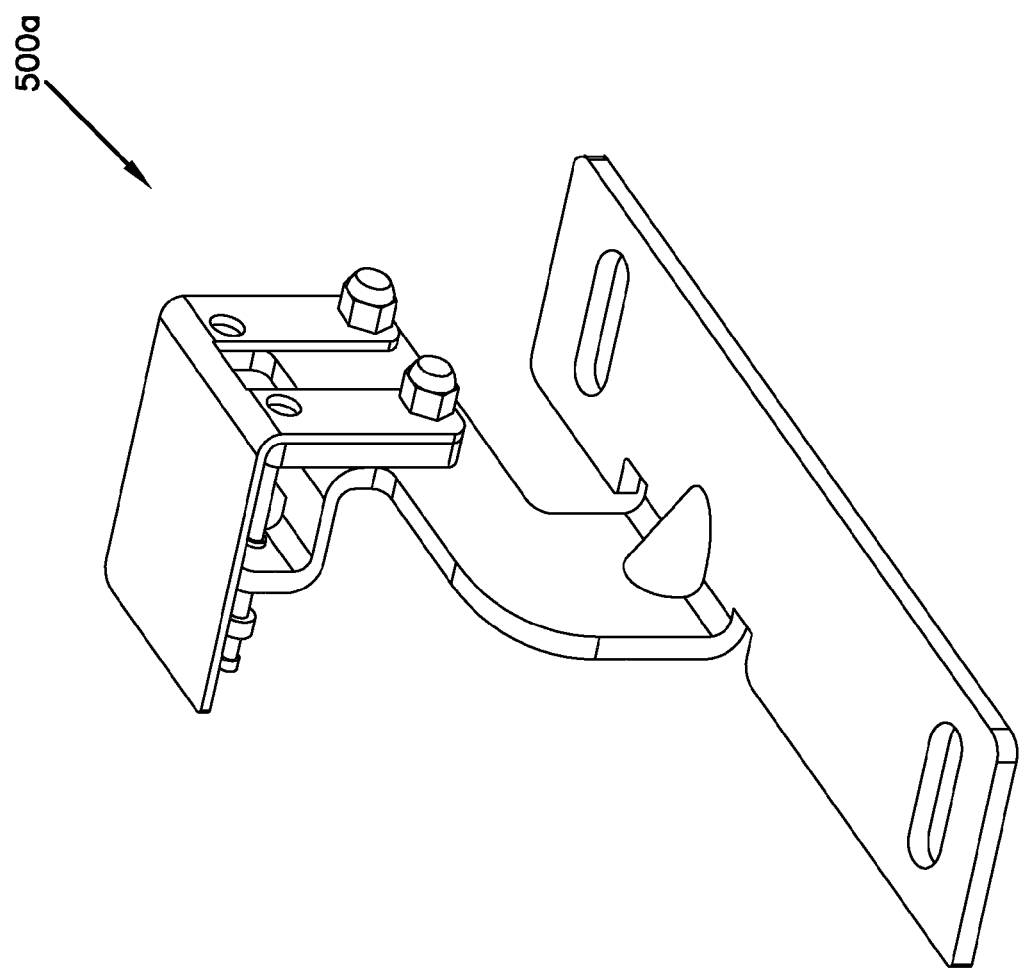
Figure 8:
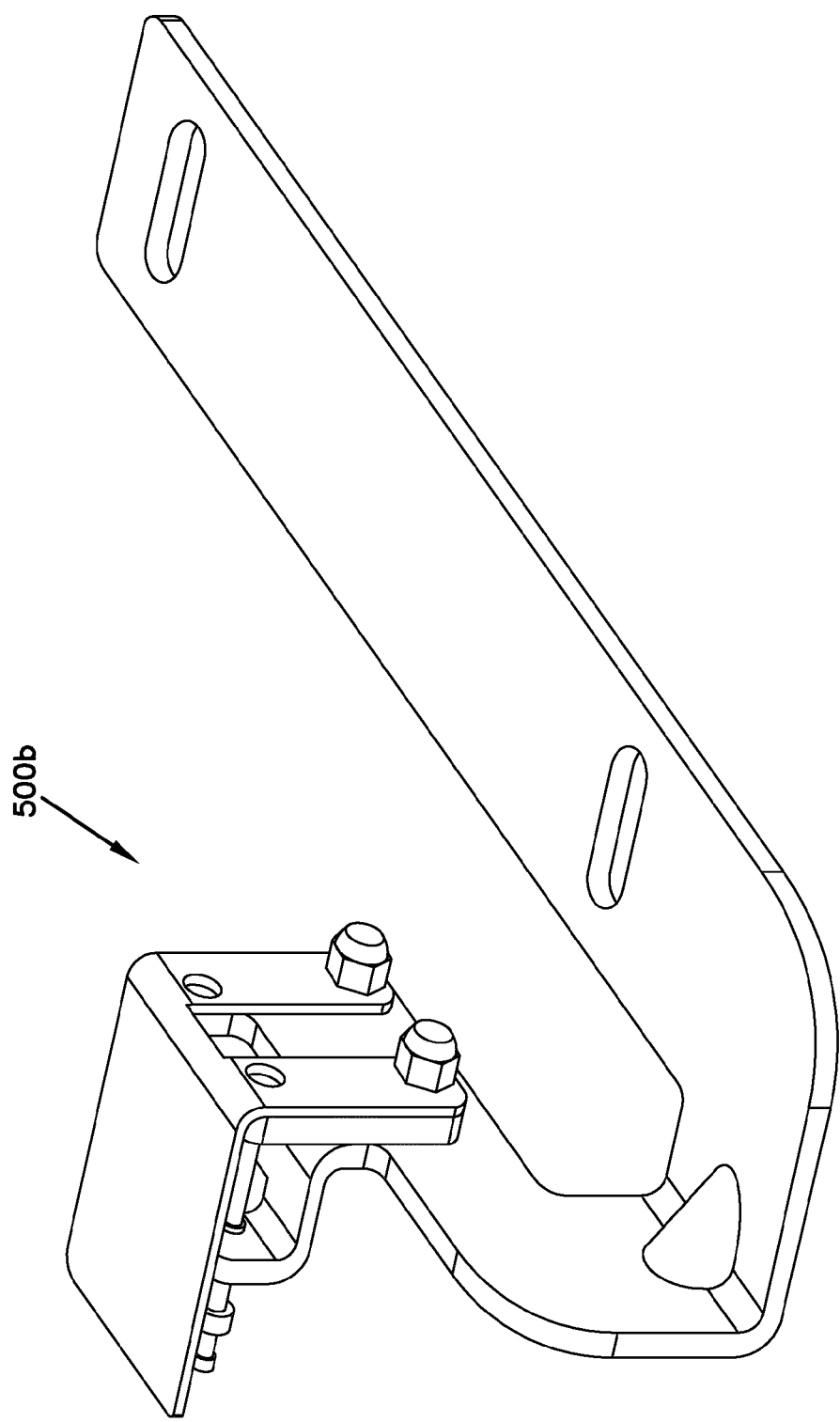
Figure 9:
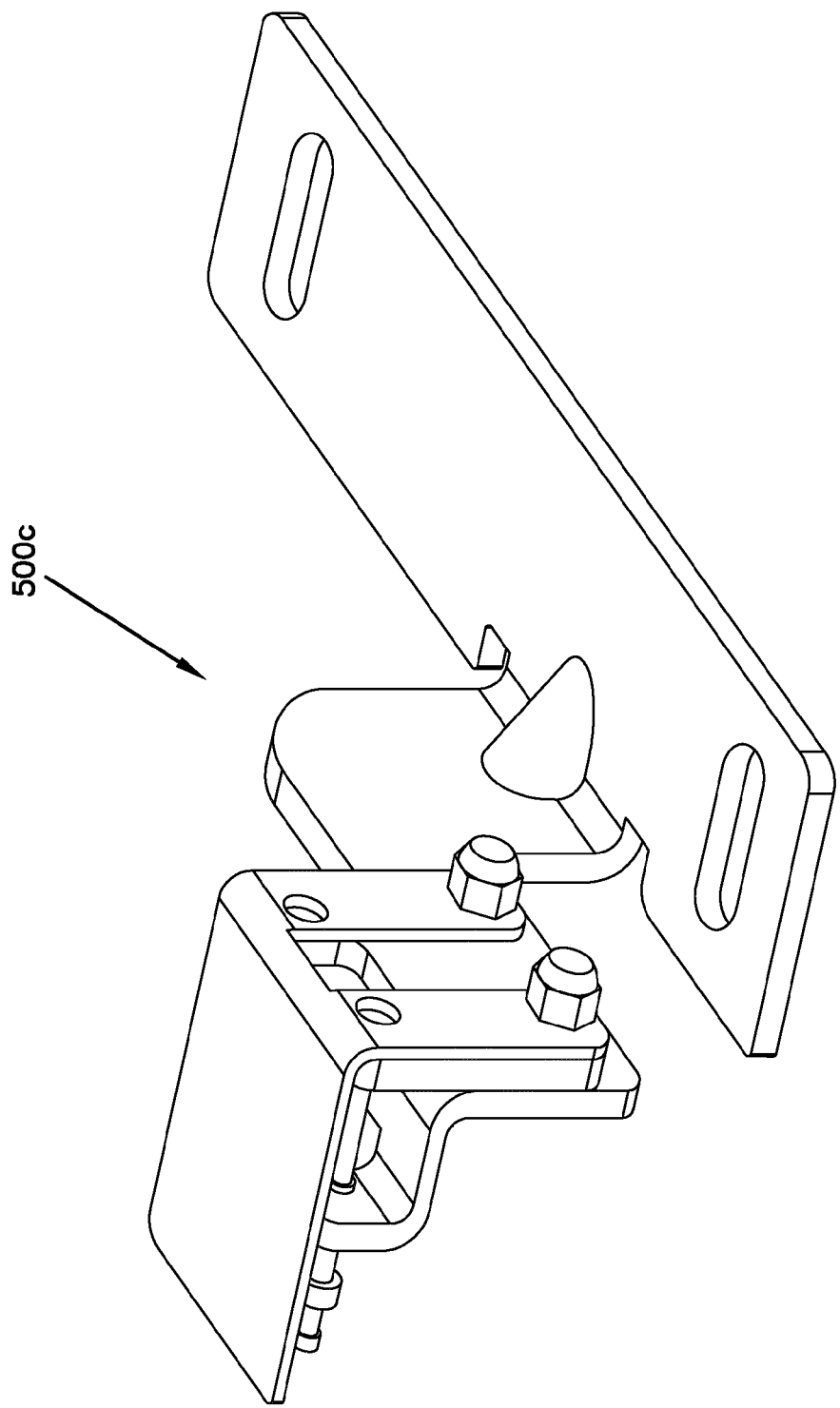
Figure 10:
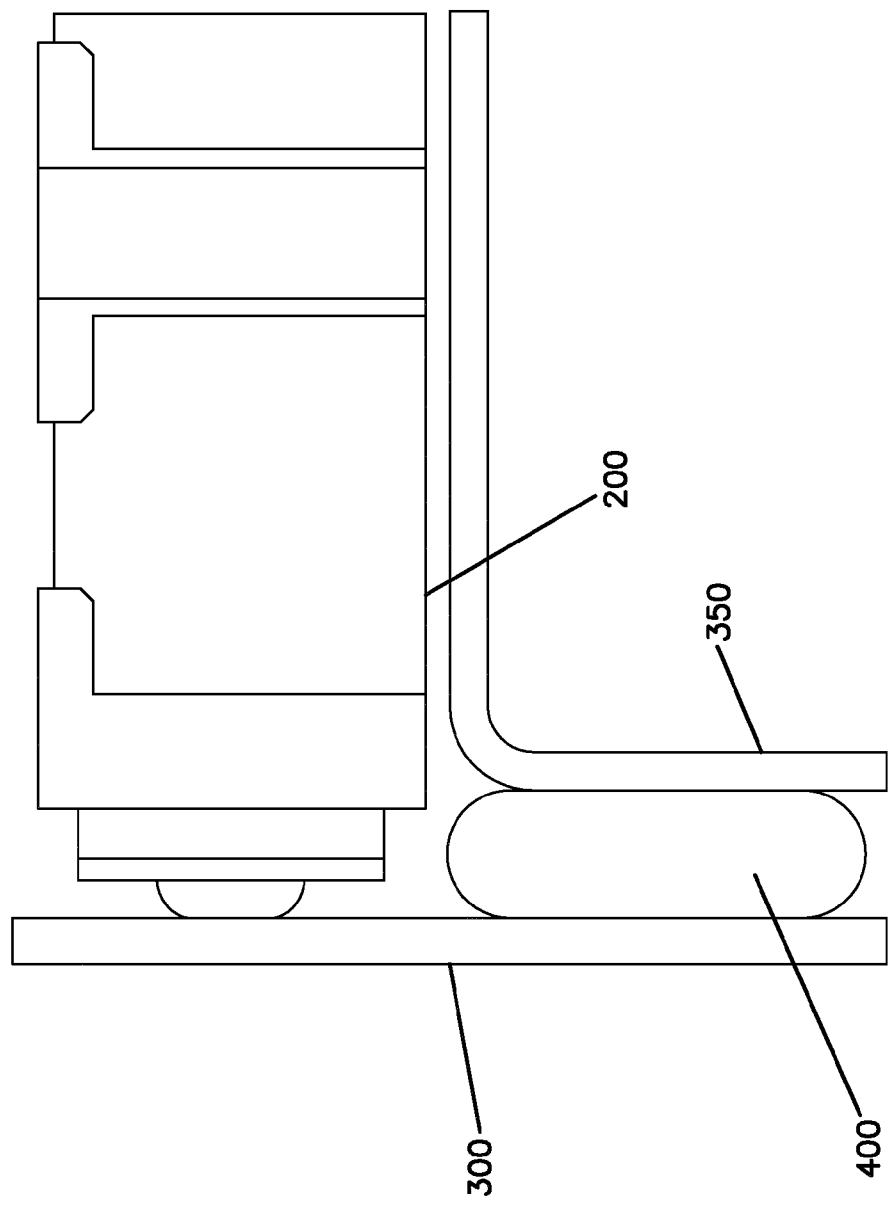
Figure 11:
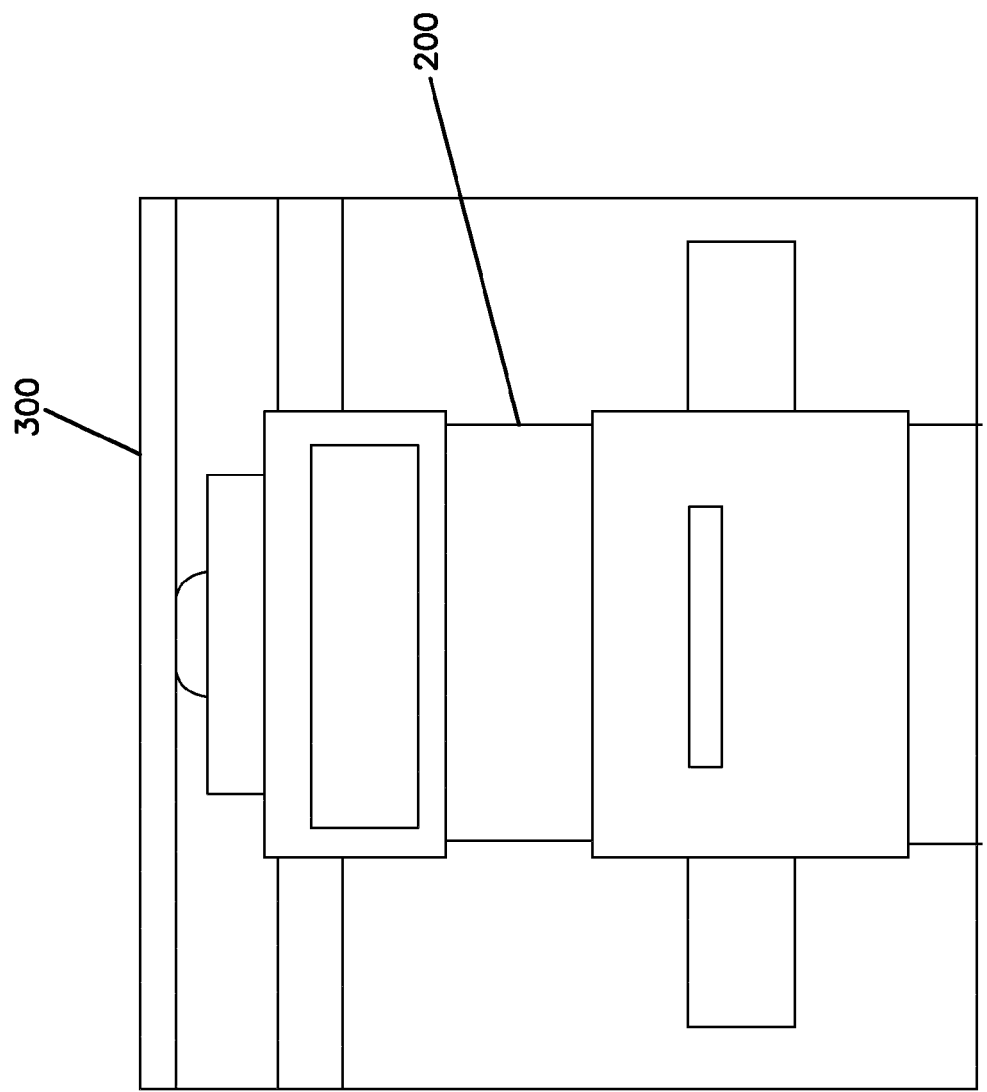
Figure 12:
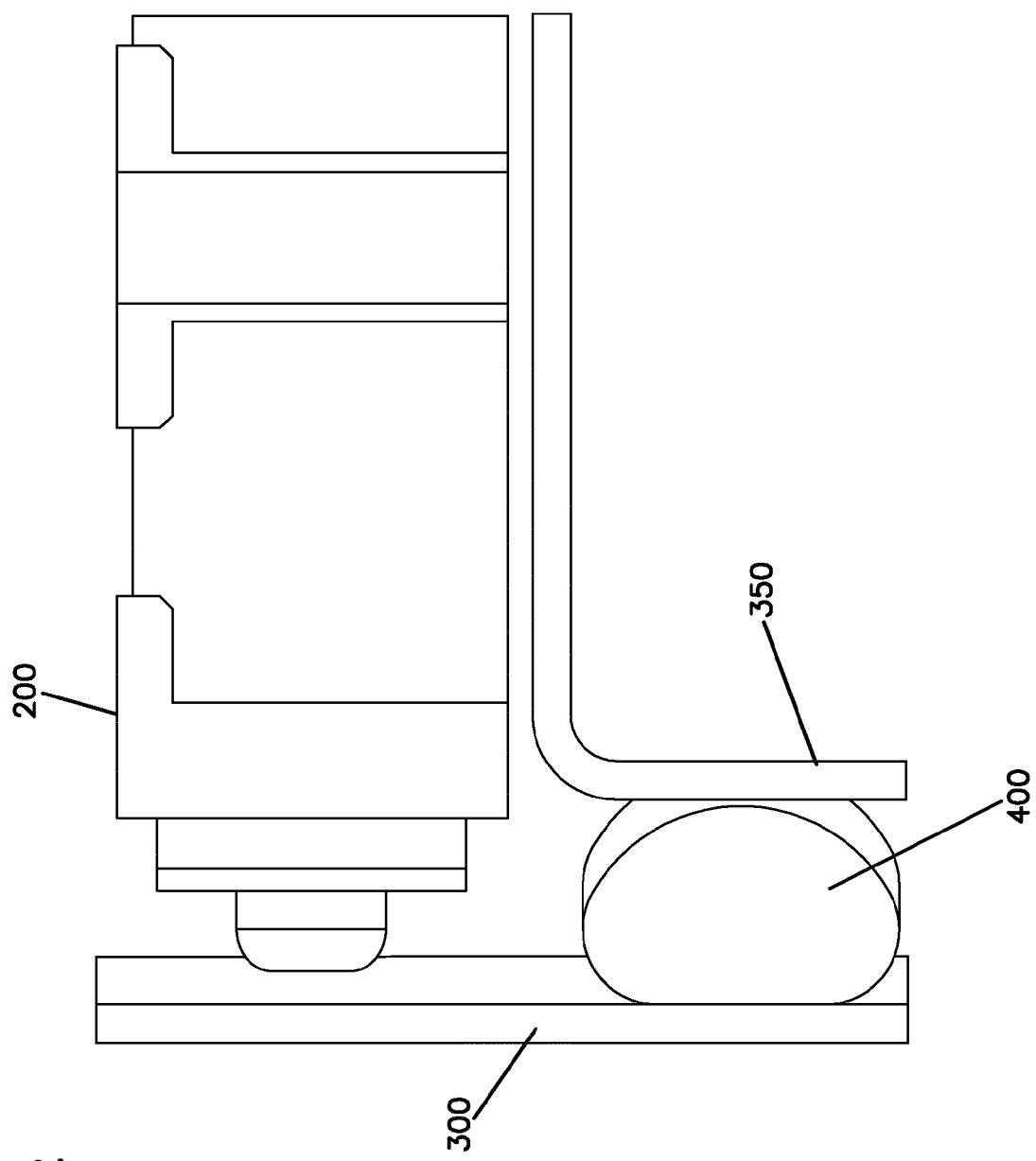
Figure 13:
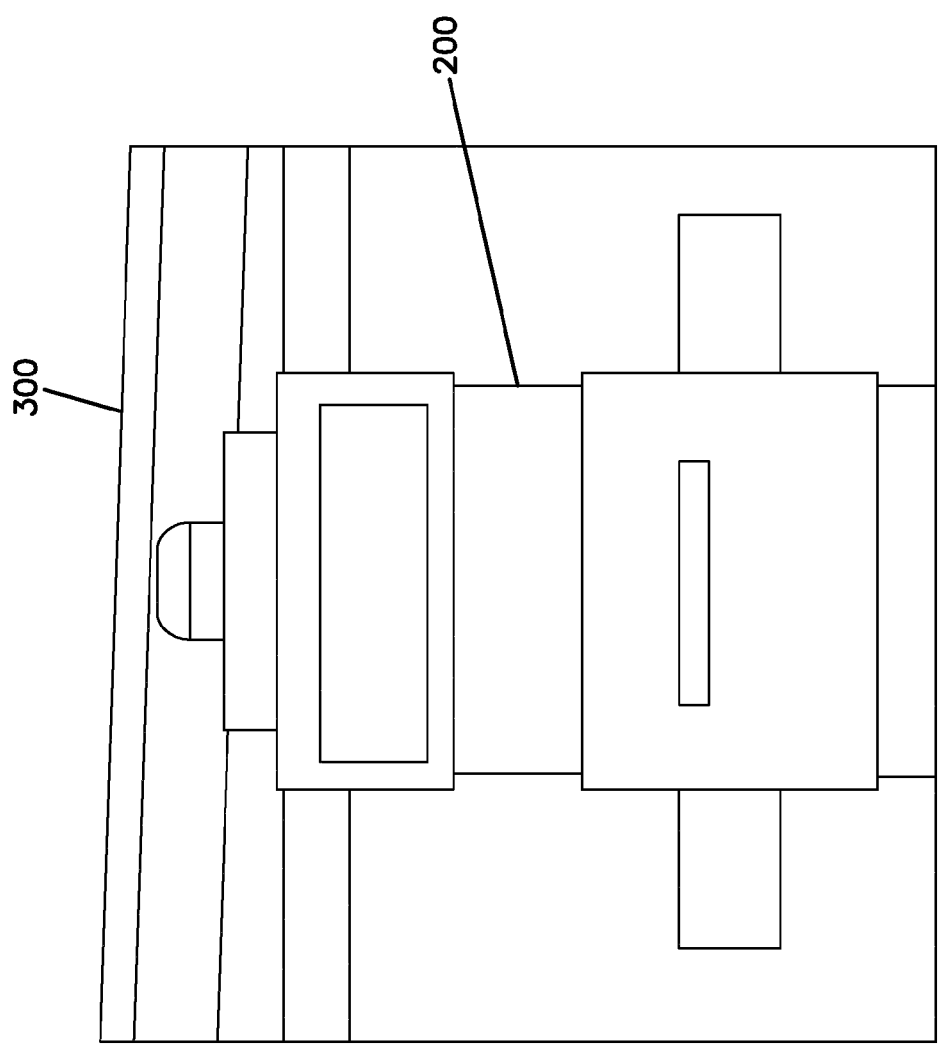
Figure 14:
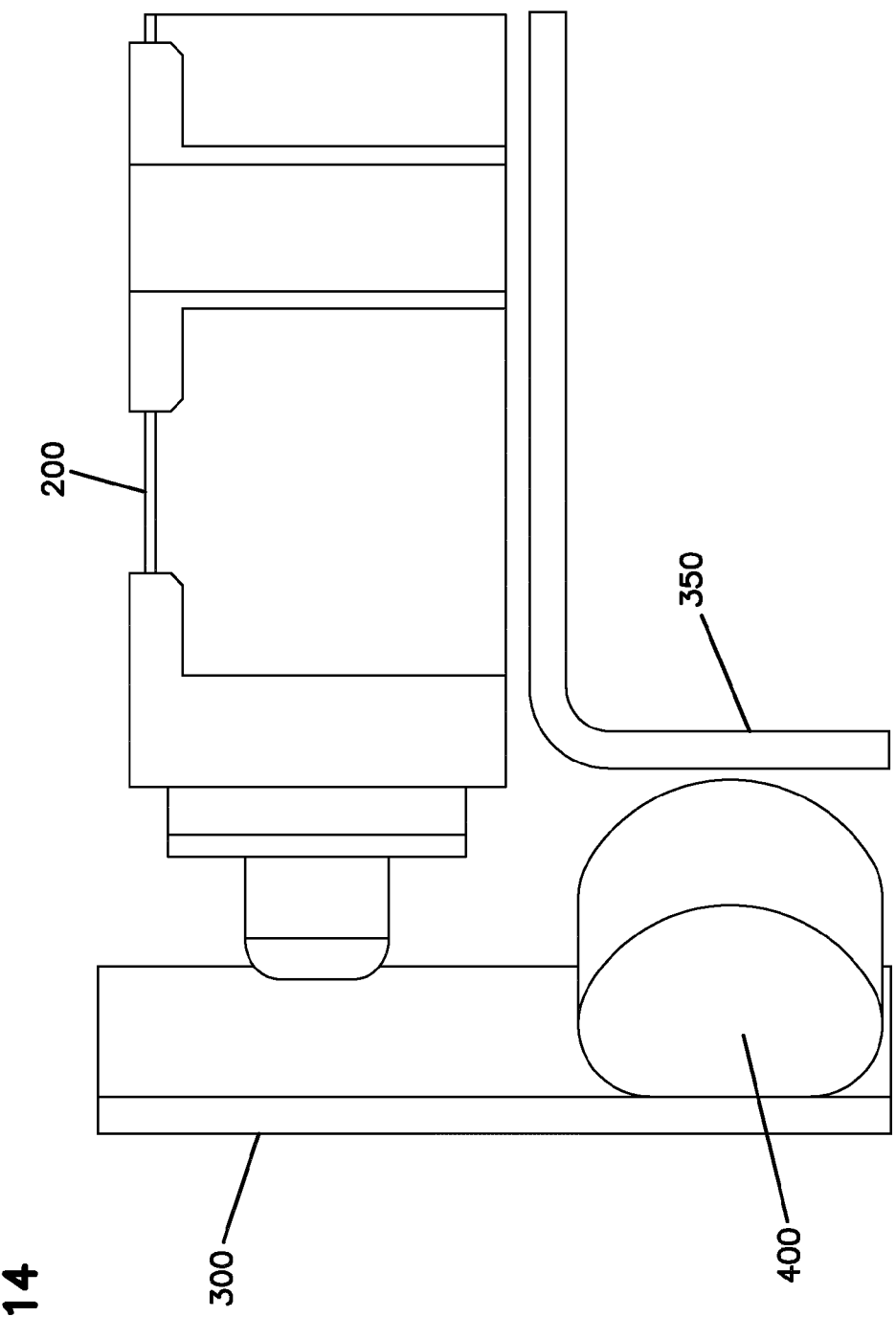
Figure 15:
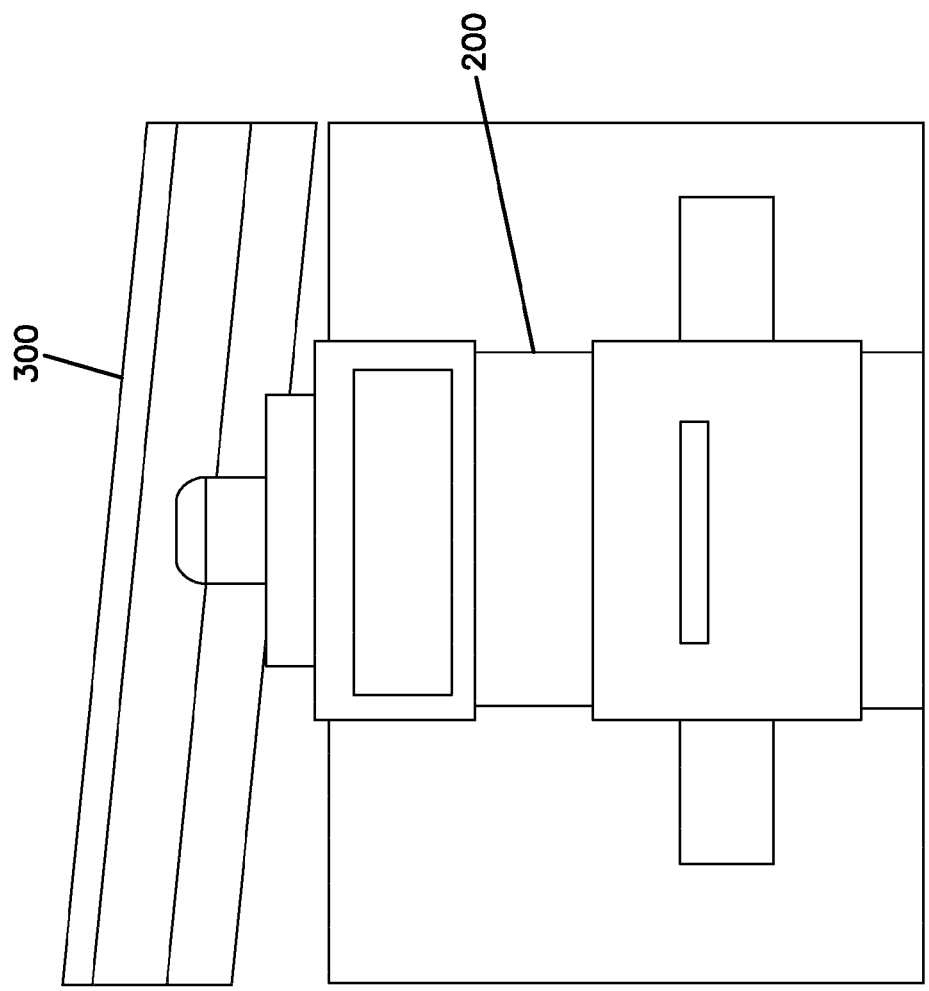
Figure 16:
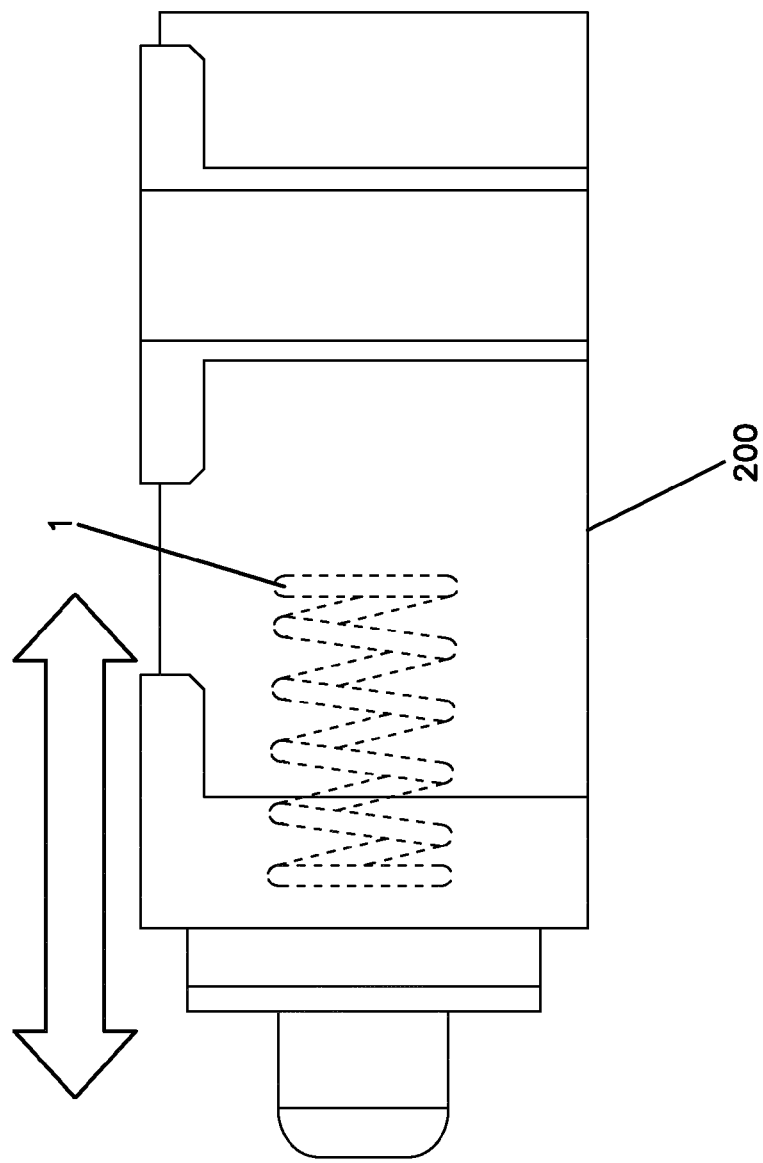
Figure 17:
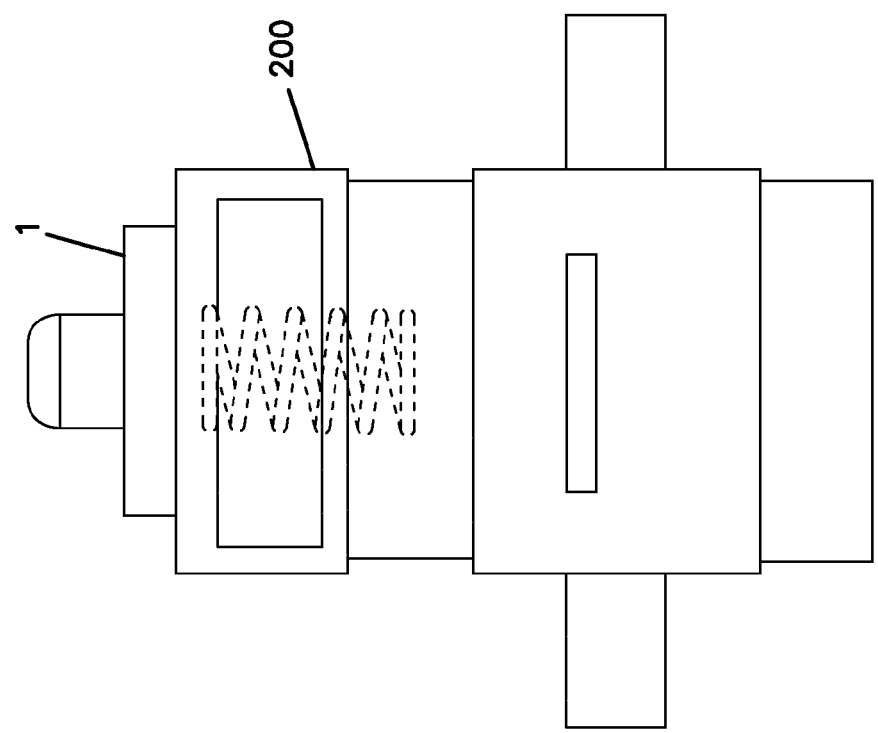
Figure 18:
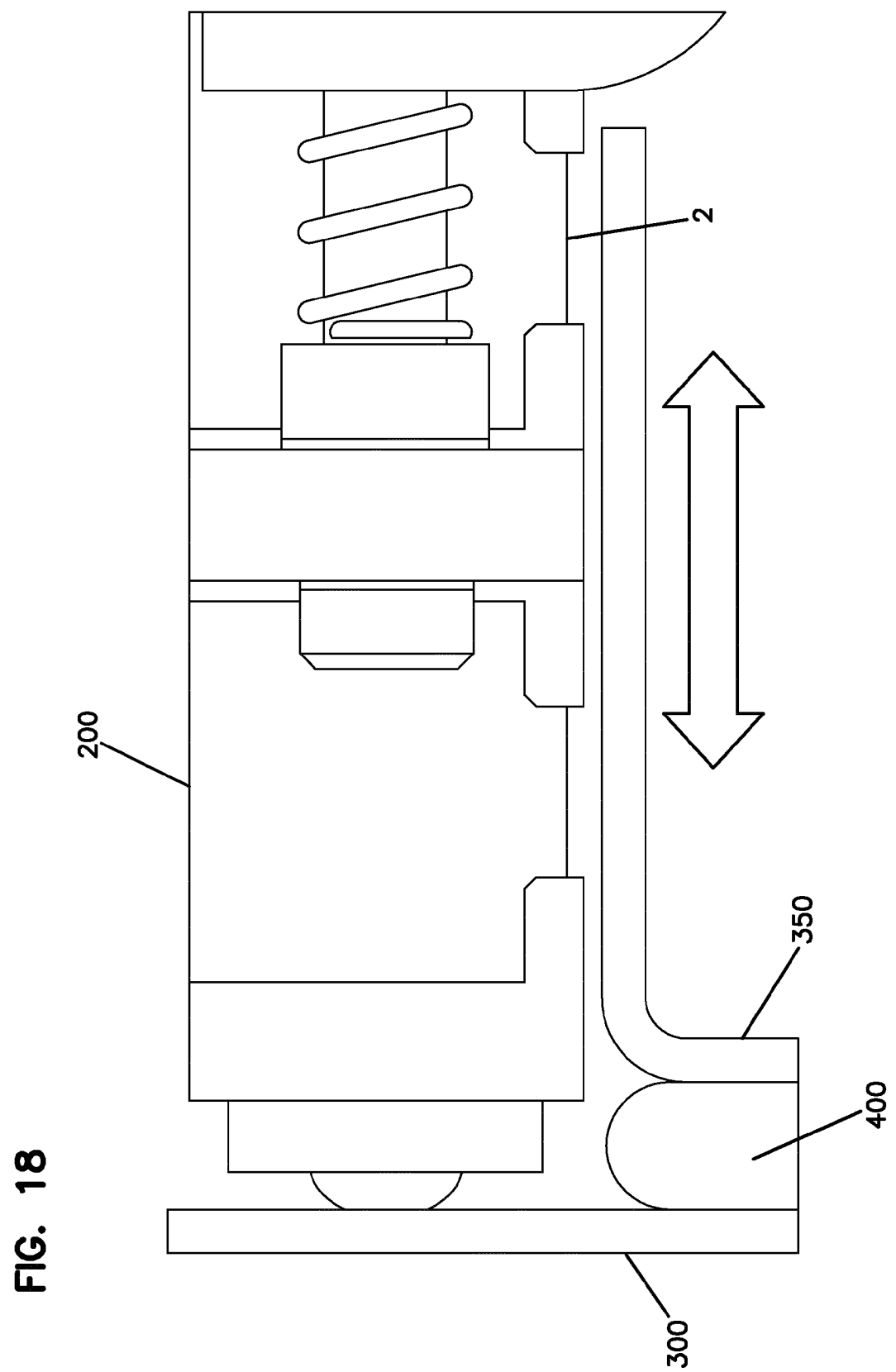
Figure 19:
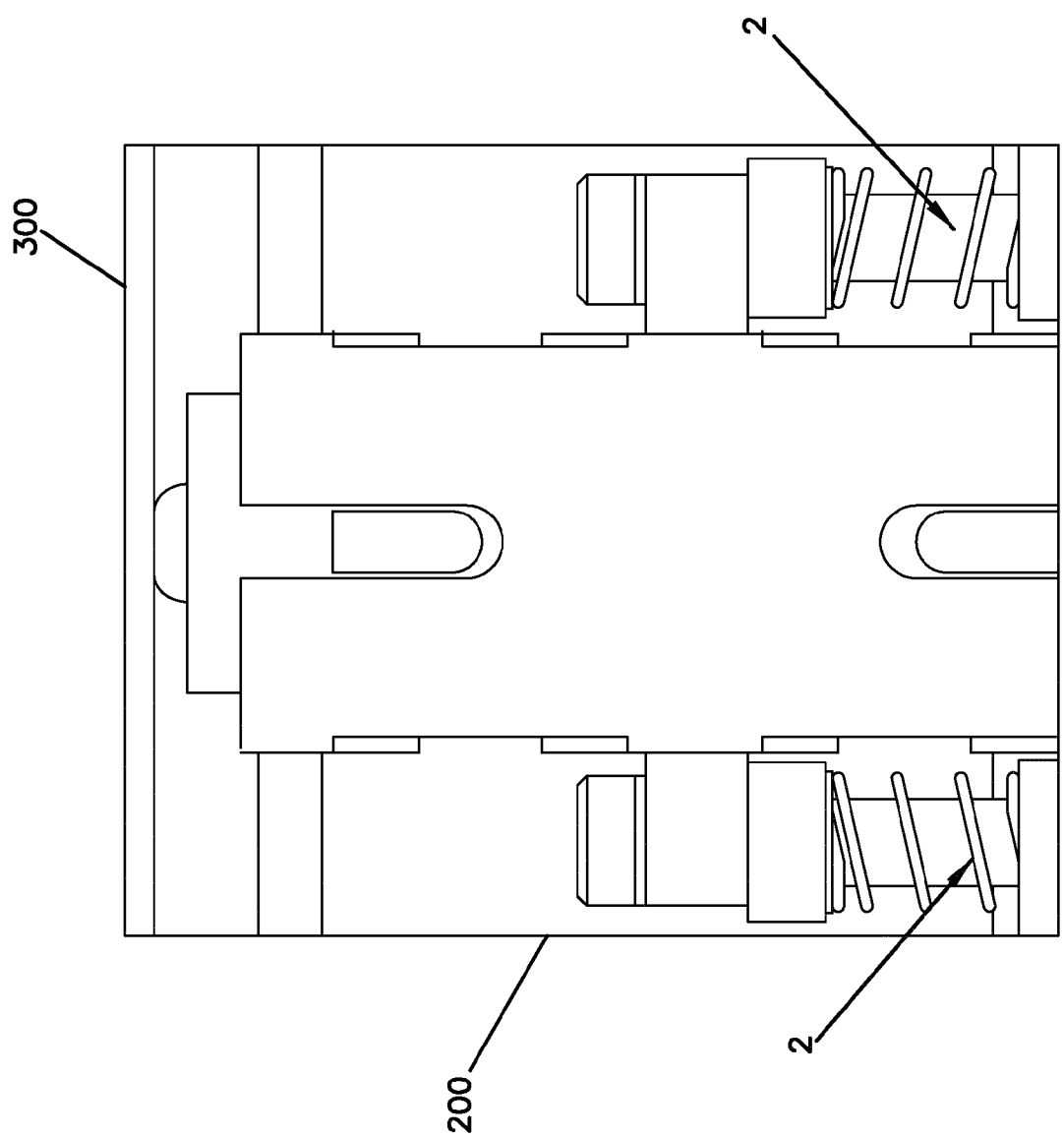

2. When the seal is fully compressed, the sensor is activated. To guarantee this, the minimum outward position of the top of the sensor (out of the cabinet wall) may be:

Δx1+Δx2+Dseal_compressed (see FIG. 6 minimum outward position of the sensor).

The positioning of the sensor will be between the extremes. This creates some tolerance for possible deformations of the cabinet during transport or mounting.

In the example implementation there may be a small preloading of the springs 2. However this preloading in one implementation is not so large that springs 2 do not move before spring 1 is bottomed out. In principle the preloading of springs 2 can indeed be so large that first spring 1 bottoms out before springs 2 move. It is also possible to have no preloading. In that case the total movement will be larger.

The purpose of the design is that the sensor indicates that sealing is achieved. If the door is not closed completely, the springs will push the door open again. The installer or technician will notice this and the sensor will be deactivated. The sensor also indicates closure of the door at the end of the installation or intervention in the cabinet.

As noted, without preloading both springs 1 and 2 will move simultaneously until spring 1 bottoms out.

If there is preloading, then spring 1 would move and later springs 2 would move, once the force on spring 1 reaches the preloading force on springs 2.

Spring 1 moves to a sensing and signaling position, and then springs 2 moves, when the force in spring 1 reaches the preloading force in springs 2.

Bracket 500 holds sensor 200 in position so that sensor 200 will signal when door 300 is properly closed and sealed against seal 400. As shown in FIGS. 5-19 seal 400 is positioned between cabinet body 450 and door 300, which in the example is hinged to cabinet body 450. Sensor 200 senses when the door is closed and the seal is compressed as in FIGS. 10 and 11. Brackets 500, 500a, 500b, 500c (see FIGS. 5-9) are adjustably mounted with fasteners and slots to cabinet body 450 at or between the maximum position of FIG. 5 and the minimum position of FIG. 6. FIGS. 12-15 show an improperly closed and unsealed condition. FIGS. 16-19 show the spring loaded sensor 200 and the mounting springs 2, which together allow for the desired sensing of the sealed condition of the cabinet.

During initial set up, and maybe during later adjustment, the bracket 500 is adjusted so that sensor 200 sends a proper signal when the door is both closed and sealed. Once installed, the sensor 200 will activate and send a closed and sealed signal to the technician each time the door is properly closed and sealed.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle, so that more kinds of devices can be achieved with overcoming the technical problem of the present invention.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A device for mounting a sensor configured to sense when a door is closed, wherein the sensor includes a housing, a mounting hole in the housing, and the sensor including a sensing contact that extends through an opening defined in the housing, the sensing contact being movable relative to the housing as the door contacts the sensing contact, the device comprising:
    a bracket configured to support the sensor and formed with a guide hole therein, wherein an opening is formed in the bracket, wherein the opening is opened at a side edge of the bracket, and wherein at least a portion of the housing of the sensor is received in the opening of the bracket;
    a support rod passing through the mounting hole in the housing of the sensor and the guide hole in the bracket; and
    an elastic element disposed on the support rod, wherein the support rod is attached to both the housing of the sensor and the bracket, the housing of the sensor being adapted to move within the opening of the bracket along the support rod against the elastic element.

2. The device according to claim 1, wherein the elastic element is configured that:
    (i) the elastic element exerts an initial deformation force F0 on the sensor when there is no an external action force F1 exerted on the sensor, the initial deformation force F0 is set to be slightly larger than a first external action force F1' under which the sensing contact of the sensor is moved to a position flush with the housing and less than a maximum external action force Fmax allowed to be exerted on the sensor; and
    (ii) the initial deformation force F0 is exerted on the sensor in a direction opposite to a direction in which the external action force F1 is exerted on the sensor, wherein when the external action force F1 exerted on the sensor is less than or equal to the initial deformation force F0, the housing of the sensor is not moved, and the elastic element is not moved and deformed by the housing; and
    wherein when the external action force F1 exerted on the sensor is increased to be larger than the initial deformation force F0, the housing of the sensor begins to be moved against the elastic element, and a portion of the external action force F1 beyond the initial deformation force F0 is converted into a deformation force of the elastic element to ensure that the sensor works normally under an overlarge external action force or an overlarge external action displacement.

3. The device according to claim 1, wherein the device comprises a plurality of support rods, and the plurality of support rods pass through respective mounting holes in the housing and respective guide holes in the bracket.

4. The device according to claim 3, wherein the support rod has a first end and a second end opposite to the first end; and
    wherein the first end of the support rod is positioned at one of the sensor and the bracket, and the second end of the support rod is positioned at the other of the sensor and the bracket.

5. The device according to claim 4, wherein a radial slot is formed in the first end of the support rod, and a stop piece is provided in the radial slot to position the first end of the support rod at one of the sensor and the bracket; and
    wherein a radial protrusion portion is formed on the second end of the support rod to position the second end of the support rod at the other of the sensor and the bracket.

6. The device according to claim 1, wherein the opening has a substantially U-shape.

7. The device according to claim 6, wherein two elastic elements are disposed at both sides of the support rod relative to the bracket, respectively.

8. The device according to claim 7, wherein the bracket further comprises:
    a first portion on which the sensor is mounted; and
    a second portion perpendicular to the first portion and fixed to a stationary body.

9. The device according to claim 8, wherein the bracket is formed by folding a strip of plate; and
    wherein the first portion is configured to be a rectangle frame formed by folding the strip of plate.

10. The device according to claim 6, wherein one elastic element is disposed at only one side of the support rod relative to the bracket.

11. The device according to claim 1, wherein the bracket further comprises:
    a first wall on which the sensor is mounted;
    a second wall perpendicular to the first wall and fixed to a stationary body; and
    a third wall connected between the first and second walls so that the bracket has a triangular shape.

12. The device according to claim 1, wherein the bracket is made by molding or machining.

13. The device according to claim 1, wherein the sensor is configured to be a contact sensor.

14. The device according to claim 1, wherein the sensor is configured to be a micro electromechanical sensor or a fiber optic sensor.

\* \* \* \* \*